(12) United States Patent
Thywissen

(10) Patent No.: US 8,332,331 B2
(45) Date of Patent: Dec. 11, 2012

(54) DETERMINING A PRICE PREMIUM FOR A PROJECT

(75) Inventor: John A. Thywissen, Plano, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1524 days.

(21) Appl. No.: 11/688,094

(22) Filed: Mar. 19, 2007

(65) Prior Publication Data

US 2008/0235155 A1 Sep. 25, 2008

(51) Int. Cl.
*G06Q 99/00* (2006.01)
(52) U.S. Cl. ............ 705/400; 705/7.42; 705/35; 705/36
(58) Field of Classification Search .................... 705/1.1, 705/7, 35–36, 400, 7.42, 34, 301; 709/205; 716/1
See application file for complete search history.

(56) References Cited

U.S. PATENT DOCUMENTS

| | | | | |
|---|---|---|---|---|
| 6,862,579 | B2* | 3/2005 | Mathews et al. | 705/36 R |
| 7,318,038 | B2* | 1/2008 | Labbi | 705/7 |
| 7,558,755 | B2* | 7/2009 | Mott | 705/37 |
| 7,908,167 | B1* | 3/2011 | Crum et al. | 705/7.42 |
| 2002/0174049 | A1* | 11/2002 | Kitahara | 705/36 |
| 2004/0148566 | A1* | 7/2004 | Jaffar et al. | 715/503 |
| 2004/0215495 | A1* | 10/2004 | Eder | 705/7 |
| 2005/0187851 | A1* | 8/2005 | Sant | 705/36 |
| 2007/0016891 | A1* | 1/2007 | Cantor | 717/120 |
| 2007/0143200 | A1* | 6/2007 | Muller et al. | 705/36 R |
| 2008/0215386 | A1* | 9/2008 | Eder | 705/7 |
| 2009/0106133 | A1* | 4/2009 | Redmayne | 705/35 |

OTHER PUBLICATIONS

Benaroch, Michael and Kauffman, Robert J., "A Case for Using Real Options Pricing Analysis to Evaluate Information Technology Project Investments", 1999, Information Systems research, vol. 10, No. 1, pp. 70-86; 19 pgs.*
Slaughter, Sandra A.; Harter, Donald E.; and Krishnan, Mayuram S., "Evaluating the Cost of Software Quality", Aug. 1999, Communications of the ACM, vol. 41, No. 8, pp. 67-73, 7 pgs.*
Erdogmus, Hakan; "Valuation of Learning Options in Software Development Under Private and Market Risk", 2002, The Engineering Economist, vol. 47, No. 1, pp. 1-47.*
Boehm et al., Value-Based Software Engineering: Reinventing "Earned Value" Monitoring and Control, Mar. 2003, University of Southern California, pp. 1-7.*
Ford, David M. et al., "A Real Options Approach to Valuing Strategic Flexibility in Uncertain Construction Projects", Jan. 2002, Dept of Engineering, Texas A&M University, Construction Management and Economics, pp. 343-351, 9 pgs.*
Brandao, Luiz E. et al., "Using Binomial Decision Trees to Solve Real-Option Valuation Problems", Jun. 2005, Decision Analysis, vol. 2, No. 2, pp. 69-88.*
Galli, A; Armstrong, M, and Jehl, B., "SPE 54929: Comparing Three Methods for Evaluating Oil Projects: Option pricing, Decision Trees, and Monte Carlo Simulations", Mar. 20-23, 1999, 1999 SPE Hydrocarbon Economics and Evaluation Symposium in Dallas, Texas; pp. 1-9.*

(Continued)

*Primary Examiner* — John Hayes
*Assistant Examiner* — Freda A Nelson

(57) ABSTRACT

A method includes accessing project information that includes values for one or more parameters of a project. The method further includes determining from the project information a project duration for the project, a time value of money for the project, a variability for the project, and an expected project price. A price premium for the project is generated according to the project duration, the time value of money, the variability value, and the expected project price, using an option-pricing mathematical model for financial instruments.

24 Claims, 3 Drawing Sheets

OTHER PUBLICATIONS

Smith, James E. and McCardle, Kevin E.; "Valuing Oil Properties: Integrating Option pricing and Decision Analysis Approaches", Sep. 1996, 20 pgs.*

M. Sandoy, T. Aven, D. Ford; Valuation of a Well Construction Project with a Flexible Project Plan, Comparison of Real Option Pricing and Monte Carlo Simulation: Feb. 27, 2004, Univ. of Stavanger, Norway and Texas A&M, 9 pgs.*

Tansey, Brendan and Stroulia, Eleni; "Valuating Software Service Development: Integrating COCOMO II and Real Options Theory", Tansey, Brendan and Stroulia, Eleni; 2007, Department of Computing Science, University; First International Workshop on the Economics of Software and Computation (ESC'07), 3 pages.*

Barry Boehm, Chris Abts and Sunita Chulani; "Software Development Cost Estimation Approaches—A Survey"; 2000, Annals of Software Engineering 10 (2000) 177-205.*

Preuninger, Ricky Don; "The Advantages of Implementing Software engineering process Models", May 2006, The University of Texas at Arlington, 85 pages.*

Galli, A; Armstrong, M, and Jehl, B., "SPE 54929: Comparing Three Methods for Evaluating Oil Projects: Option pricing, U Decision Trees, and Monte Carlo Simulations", Mar. 20-23, 1999, 1999 SPE Hydrocarbon Economics and Evaluation Symposium in Dallas, Texas; pp. 1-9.*

Boukendour, Said; "Estimating Software Cost Contingency Using Options Theory", Mar. 2005, Proceedings of the International Conference on Information Technology: Coding and Computing (ITCC '05), IEEE Computer Society, 4 pages.*

Moustafaev, Jamal, BBA, MBA, PMP; Risk-Adjusted Project Costs Estimation in the Black-Scholes Framework, 2006, PMI Research 2006 in Montreal; Think Tank Consulting, 16 pages.*

Tansey, Brendan and Stroulia, Eleni; "Valuating Software Service Development: Integrating COCOMO II and Real Options Theory", 2007, Department of Computing Science, University; First International Workshop on the Economics of Software and Computation (ESC'07), 3 pages.*

Qin, Wu and Ruxiang, Wei; "Study and Application of Military Software Pricing Based on Option Pricing"; Mar. 2010; Department of Equipment Economics and Management, Naval University of Engineering; 2nd International Conference on Software Technology and Engineering(ICSTE); v2-335-v2-339, 5 pages.*

Wang, Tao and de Neufville, Richard, "Identification of Real Options "In" Projects", 2005, Paper #147, pp. 1-9.*

* cited by examiner

OPENING TRANSACTIONS

CLOSING TRANSACTIONS

DETERMINING A PRICE PREMIUM FOR A PROJECT

TECHNICAL FIELD OF THE INVENTION

This invention relates generally to project management and more particularly to determining a price premium for a project.

BACKGROUND

Entities such as business enterprises, referred to as contractors, often contract with other entities such as other business enterprises, referred to as customers (or clients), to perform one or more projects for the customers. For example, a contractor may contract with a customer to perform one or more services projects for the customer. As a particular example, a contractor may contract with a customer to provide services relating to one or more software applications. The services contemplated by the contract may include, as examples, development services, enhancement services, maintenance services, or any other suitable services. For example, in the software development field, a development project may refer to a collection of work tasks, with each task having a specific start date and end date and a specific software product (e.g., one or more applications) to be delivered. Pricing these services or other projects can be challenging from the perspective of both the contractor and the customer.

SUMMARY

According to the present invention, disadvantages and problems associated with previous techniques for determining a price premium for a project may be reduced or eliminated.

In certain embodiments, a method for determining a price premium for a project includes accessing project information that includes values for one or more parameters of a project. The method further includes determining from the project information a project duration for the project, a time value of money for the project, a variability for the project, and an expected project price. A price premium for the project is generated according to the project duration, the time value of money, the variability value, and the expected project price, using an option-pricing mathematical model for financial instruments.

Particular embodiments of the present invention may provide one or more technical advantages. In certain embodiments, a price premium for the price of a project is determined in part to account for the risk in the variability of the project. As such, the price premium may be thought of as risk insurance for the variability of the project. In certain embodiments, relative to conventional techniques, the present invention provides a more accurate determination of the appropriate price premium to include in the price for a project. Previous techniques for pricing risks in services projects such as software projects often relied on "rules of thumb" or "fudge factors," which may be based on a sales team's intuition and experience without any real rigor. On the other hand, certain embodiments of the present invention provide a technique for quantifying a variance value associated with a project and using that variance value in generating a price premium for the project. In certain embodiments, using an option-pricing mathematical model for financial instruments provides a suitable way to quantify the risk associated with a project, resulting in a price premium for the project.

In certain embodiments, the present invention may be used with either fixed price or time-and-materials pricing. In certain embodiments, the present invention prices projects in a manner that is substantially equitable for both the customer and the contractor, such that the risk is shared more evenly than with conventional techniques for pricing projects. In certain embodiments, the present invention may be used by a contractor as a strategic component in bidding for contracts. The present invention may facilitate a more collaborative dialogue around questions that may be raised by the pricing of projects that are not possible with conventional techniques.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention and its advantages, reference is made to the following descriptions, taken in conjunction with the accompanying drawings, in which.

DESCRIPTION OF EXAMPLE EMBODIMENTS

Figure 1:
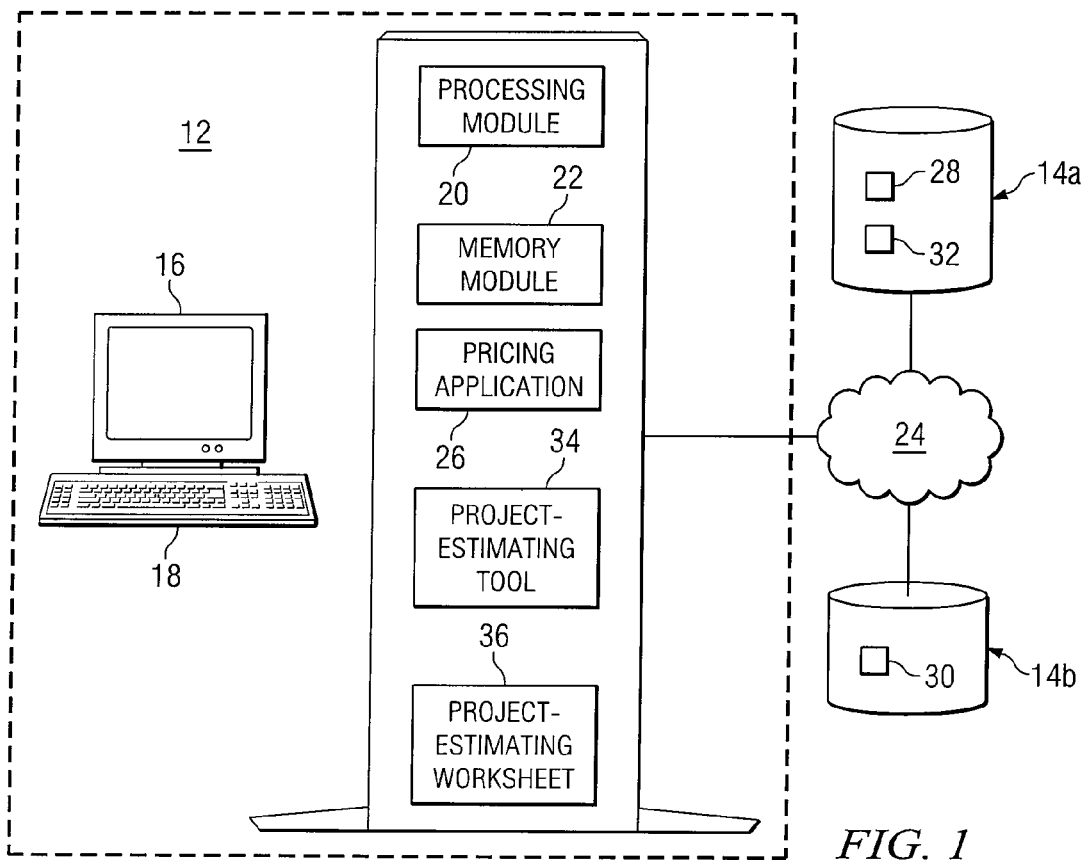
FIG. 1 illustrates an example system for determining a price premium for a project according to certain embodiments of the present invention.

FIG. 1 illustrates an example system 10 for determining a price premium for a project according to certain embodiments of the present invention. System 10 includes a user system 12 and one or more databases 14. Although an example implementation of system 10 is illustrated and primarily described, the present invention contemplates any suitable implementation of system 10.

System 10 or portions of system 10 may be associated with an entity such as a business enterprise. In certain embodiments, the business enterprise may be a contractor seeking to enter into new services contracts or manage existing services contracts, in any suitable combination, with one or more customers. For example, the contractor may be seeking to enter a bid for a new project in response to a request for quote (RFQ) received from a potential or existing customer.

To enter a bid for a project, a contractor may determine a price for the project. In certain embodiments, system 10 is operable to determine a price premium for a project, in response to an RFQ for example, which may be included in the bid for the project. The present invention may be used to determine a price premium for any suitable type of services project. This description will focus on embodiments in which the services project comprises a software development project; however, it should be understood that the present invention contemplates system 10 determining a price premium for any suitable type of services project. As just two additional examples, the services project could include a manufacturing project or a construction project.

In a particular example in which the services project is a software development project, work performed to develop the software (e.g., by systems engineers, programmers, managers, and other suitable personnel) may include (in any suitable combination) development services, enhancement services, maintenance services, and/or any other suitable type of service. For example, development services may include the creation of new solutions to problems solved by an existing software application or the replacement of an existing software application. Generally, a new software application may be developed as one project, or it may be developed in phases, with a deliverable for each phase for example. As another example, enhancement services may include the creation, installation, and integration of new functions in a software application, typically in response to a customer's or user's changes in requirements. Enhancement services may include any new functions that are needed to improve efficiency or enhance the level of service that the software application provides. As another example, maintenance services may include the correction of errors caused by any of a variety of different items or tasks, including but not limited to software programs, hardware, networks, scheduling, job control language, and software upgrades or changes. Maintenance services may also include the correction of a software application that fails to perform to the original functional specifications. Although development services, enhancement services, and maintenance services have been described, the present invention contemplates any suitable types of services.

Providing services, such as software development services, typically involves risk. For example, a risk may be that the value attributed to a project at the beginning of a project will change sometime before or at the time the project is completed. As a more particular example, the risk may be that the expected price of a project (i.e., the price used to bid on the project) may differ from the actual cost of the project (i.e., the cost determined when the project is completed). Much of this risk is allocated between the stakeholders (e.g., the contractor and the customer) by a pricing model used to generate a price for the services. For example, time-and-materials pricing generally places a substantial portion of the risk on the acquirer of the services (e.g., the customer). "Capping" the time-and-materials pricing often moves the majority of the risk to the supplier (e.g., the contractor).

In a particular example in which the services project is a non-software project, the services contract may be a master agreement for a call center that handles calls related to employee benefits questions. This agreement may be associated with a length-of-call risk. For example, the costs associated with the master agreement may be affected by the call volume (i.e., number of calls) and the talk time for each call. The call volume and talk time may be estimated at the time the agreement is entered into as a part of determining the price of the agreement. Suppose, for example, that pricing is determined on a per-call basis. A risk may exist that the talk time is miscalculated at the time at which the agreement is entered.

Fixed pricing is a typical way to split certain risks between the contractor and the customer. With fixed pricing, the contractor and the customer agree on a "fair" price for a fixed scope of services (e.g., the development of a particular software application that meets a specified set of requirements), and the contractor carries the risk that the actual cost to provide the services (realized at the conclusion of a services project) will vary from the expected costs to provide the services (determined at the time the price is determined, usually at the time the bid is generated). According to this fixed-price model, if the contractor is able to provide the services in a more cost-efficient manner than expected, then the contractor retains the extra profit. If, however, the contractor experiences higher costs than expected for providing the services, then the contractor's profits may be reduced or even eliminated, possibly incurring a loss.

When establishing the "fair" fixed price, since the contractor is assuming the additional risk from the customer compared to the time-and-materials price, the contractor typically seeks a project price that includes a premium above the expected price resulting from a pure time-and-materials pricing analysis. In such a scenario, the price to the customer is typically the expected cost of the project (e.g., calculated using the time-and-materials pricing model or some other pricing model) plus some price premium. The price premium is, at least in part, designed to account for the risk of the project to the contractor. In general, previous and existing solutions for determining this price premium simply rely on "rules of thumb" or "fudge factors," which are based primarily on a sales team's intuition and lack any real rigor.

As an example, a services project that is being priced may be a software development project, which may include building a new software product for a customer according to the customer's specifications (e.g., as specified in an RFQ from the customer). This may be the contractor's first time (or may even be any entity's first time) to develop software of the requested type, which means that the provision and pricing of the services may involve a number of unknowns. Thus, it may be difficult to estimate how much effort and cost will be involved in building and delivering the new software product. For example, the new software product may be more costly or otherwise more difficult to develop than is initially estimated, which may be a source of risk for the contractor. The relevant industry or the contractor may have some data regarding what types of projects tend to be very close to their initial estimates such that prices for projects of those types are relatively easy to estimate accurately. Some data may also exist regarding what types of projects tend to be "wild cards" in that actual prices for projects of those types can vary greatly from the expected price. When pricing the new software product, the contractor may be faced with these two different types of projects and may attempt to develop a different risk premium on the fixed price for each of those two types. Quantifying this premium has been difficult or impossible using previous and existing solutions.

As will be described in more detail below, certain embodiments of the present invention are operable to determine a price premium for a project. Additionally or alternatively, certain embodiments of the present invention may determine a total price for a project, the total price comprising a price premium for the project and an expected price for the project. The price premium determined according to the present invention may more accurately value the risk associated with the pricing of a project relative to conventional techniques for determining a price premium.

Returning to the example system 10 illustrated in FIG. 1, system 10 includes a user system 12, which may be associated with a business enterprise, such as a contractor. User system 12 and databases 14 may be associated with the same enterprise; however, the present invention contemplates the enterprise with which user system 12 is associated being different from the enterprise with which one or more of databases 14 are associated. Users of user system 12 may include various employees of the enterprise, employees of a third party providing services to the enterprise (e.g., a consulting firm), or any other suitable users according to particular needs. User system 12 and users of user system 12 may be referred to interchangeably throughout this description.

User system 12 may include one or more computers at one or more locations, which may share data storage, communications, or other resources. For example, functionality described in connection with user system 12 may be provided using a single computer system, which in a particular embodiment might include a conventional desktop or laptop computer such as a personal computer (PC). Although a user system 12 is described primarily as a PC, the present invention contemplates user system 12 being any suitable type of computer system, according to particular needs. For example, user system 12 could include a client-server system. Furthermore, functionality described in connection with user system 12 may be provided using any suitable combination of software, firmware, and hardware. Although a single user system 12 is illustrated and primarily described, the present invention contemplates system 10 including any suitable number of user systems 12. For example, in certain embodiments, system 10 includes multiple distributed user systems 12, which may be physically distributed, being in different physical locations geographically remote from each other, or logically distributed, being at approximately the same location as other user systems 12.

Each computer system of user system 12 may include one or more suitable input devices, output devices, mass storage media, processors, memory, or other components for receiving, processing, storing, and communicating information according to the operation of system 10. User system 12 includes one or more display modules 16, each of which may include a computer monitor, television, projector, or any other suitable type of display device. User system 12 includes one or more input devices 18, which may include a keyboard, a mouse, or any other suitable input devices. Although particular input devices 18 are illustrated and described, the present invention contemplates user system 12 receiving input from a user in any suitable manner. For example, display module 16 may include touch-screen capabilities. As another example, one or more applications running on user system 12 may interact with user system 12 to automatically provide certain inputs. As yet another example, user system 12 may include voice recognition capabilities such that a user of user system 12 may speak into an input device 18 (e.g., a microphone) to input commands or data.

A processing module 20 may include one or more processing units, which may each include one or more microprocessors, controllers, or any other suitable computing devices or resources. Processing module 20 may work either alone or in combination with other components of user system 12 to provide the functionality of user system 12. For example, operations performed by processing module 20 may be performed collectively by processing module 20 and memory module 22.

User system 12 may include or otherwise be associated with one or more memory modules 22. Each memory module 22 may take the form of volatile or non-volatile memory including, without limitation, magnetic media, optical media, random access memory (RAM), read-only memory (ROM), removable media, or any other suitable memory component. In certain embodiments, memory module 22 comprises one or more databases, such as one or more Structured Query Language (SQL) databases or any other suitable types of databases. Memory module 22 may be local to or remote from the one or more processing units 18 of user system 12.

System 10 includes one or more databases 14. Each database 14 may include any memory or database module and may take the form of volatile or non-volatile memory including, without limitation, magnetic media, optical media, random access memory (RAM), read-only memory (ROM), removable media, or any other suitable local or memory component. In particular embodiments, databases 14 each include one or more SQL servers. Although a particular number of databases 14 is illustrated, system 10 may include any suitable number of databases 14 according to particular needs. Additionally, databases 14 may each be external or integral to other components of system 10. For example, one or more of databases 14 may be internal to user system 12. Example contents of databases 14 are described in more detail below.

In certain embodiments, system 10 includes a network 24, which may couple user system 12 to databases 14. Network 24 may include one or more local area networks (LANs), metropolitan area networks (MANs), wide area networks (WANs), radio access networks (RANs), a global computer network such as the Internet, or any other wireline, optical, wireless, or other links. Network 24 may communicate, for example, IP packets, Frame Relay frames, or Asynchronous Transfer Mode (ATM) cells to communicate voice, video, data, and other suitable information between network addresses. User system 12 may interact with databases 14 through network 24. The present invention contemplates any suitable intervening servers (e.g., one or more web servers) or other communication equipment (e.g., routers, switches, etc.) between user system 12 and databases 14.

System 10 may include a pricing application 26, which may include any suitable combination of software, firmware, and hardware. In certain embodiments, portions or all of pricing application 26 may be implemented using MICROSOFT EXCEL or another suitable spreadsheet program; however, the present invention is not intended to be limited to those embodiments.

In general, pricing application 26 is operable to generate a price premium for a project or a total price for a project (the total price comprising a price premium for the project and an expected price for the project) according to an option-pricing mathematical model for a financial instrument. For example, the price premium for the project may be calculated using one or more formulas derived from an option-pricing mathematical model for a financial instrument. As used throughout this description, a financial instrument may include a tradeable form of a commodity or financial capital that exists in the context of a financial market. Example financial instruments include stocks, bonds, commodities, and currency. Additionally, as used throughout this description, an option may include a contract granting one party (e.g., the holder or buyer of the option) the right but not the obligation to exercise a feature of the contract (i.e., the option) on or before a future date, and obligating another party (e.g., the writer or seller) to honor or fulfill the specified feature of the contract (i.e., the option). In the context of financial instruments, common types of options include a "put option" (which gives the holder the right but not the obligation to sell a specified amount of the financial instrument within a specified time period at an agreed price (the exercise or strike price)) and a "call option" (which gives the holder the right but not the obligation to purchase a specified amount of the financial instrument within a specified time period at an agreed price (the exercise or strike price)). The option is purchased for a premium, which is what option-pricing mathematical models for financial instruments are traditionally designed to determine.

Figure 2:
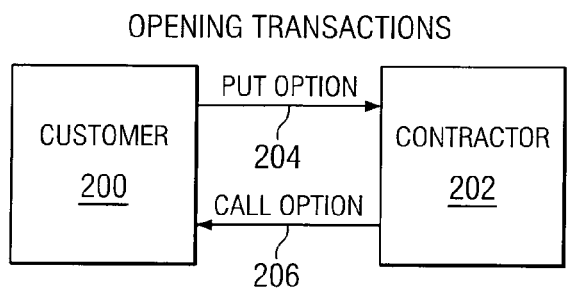
FIG. 2 illustrates an example set of opening transactions demonstrating the analogy between transactions for options on financial instrument and options the pricing of services projects.
Figure 3:
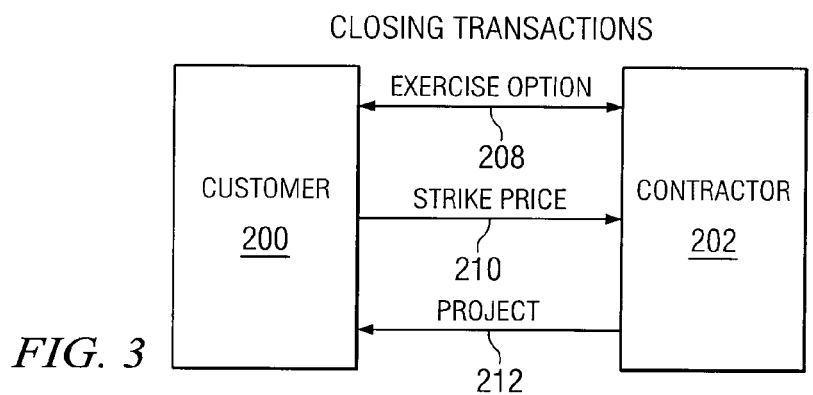
FIG. 3 illustrates an example set of closing transactions demonstrating the analogy between transactions for options on financial instrument and options the pricing of services projects.

Various factors may influence the risk level of a project in terms of the pricing of the project. At least certain of the same factors that are typically used in pricing options for financial instruments are substantially similar to factors in determining the risk of a project. Such factors may include, for example, the duration of the project (which may be analogous to the duration of the option), the time value of money (which may be analogous to the discount rate applied to an option), a variability value (which may be analogous to a variability value applied when pricing an option), and an expected project price (which may be analogous to the price of the underlying financial instrument). Additionally, according to certain embodiments of the present invention, the transactions involved in selling (by a contractor) and purchasing (by a customer) a services project may be viewed as analogous to the purchase and sale of options for financial instruments. FIGS. 2-3 demonstrate an example analogy between the transactions involved in options for financial instruments and the transactions involved in bidding for and purchasing a services project.

FIG. 2 illustrates an example set of opening transactions demonstrating the analogy between transactions for options on financial instrument and options on a services project. In the example illustrated in FIG. 2, the customer is represented by box 200 and the contractor is represented by box 202. In one example, once a project is committed to (i.e., once a pricing quote with a commitment exists), the customer opens a position in a manner substantially equivalent to the following transactions: (1) the customer writes a European put option (i.e., sells to the contractor) with a strike price at the price for the project, as shown at arrow 204; and (2) buys a European call option (i.e., from the contractor) with a strike price at the price for the project, as shown at arrow 206.

FIG. 3 illustrates an example set of closing transactions demonstrating analogy between transactions for options on financial instrument and options on a services project. The customer is again represented by box 200 and the contractor is again represented by box 202. Once a project is completed, the customer closes its position in a manner substantially equivalent to the following transactions: (1) if the actual price of the project is greater than the expected price of the project, the customer exercises the call option, as shown at arrow 204; (2) if the actual price of the project is less than the expected price of the project, the customer prepares for the contractor to exercise the put option, also as shown at arrow 208; and (3) if the actual price of the project is equal to the expected price of the project, either the put option or the call option (but not both) should be exercised.

Based on these scenarios, the outcome for the customer may be as follows:

Opening: Gain the price of the put sold, and lose the cost of the call purchase;

Closing: Lose the strike price 210 of the options, and gain the project 212. The result may be that the customer pays a set price for the project, plus the net costs of the options, and receives the project.

Returning to FIG. 1, the option-pricing mathematical model may include any suitable option-pricing mathematical model for pricing options for financial instruments. For example, the option-pricing mathematical model may include the Black-Scholes model, Merton model, Black model (e.g., the Black 76 model), binomial method, or any other suitable option-pricing mathematical model for financial instruments.

In certain embodiments, the particular option-pricing mathematical model used by pricing application 26 includes the following formula of the Black-Sholes model:

$$C = SN(d) - Le^{-rt} N(d - \sigma\sqrt{t}).$$

The variable d may be determined according to the following formula:

$$d = \frac{\ln\frac{S}{L} + \left(r + \frac{\sigma^2}{2}\right)t}{\sigma\sqrt{t}}.$$

In certain embodiments, the variables of these formulas may have the following meanings for determining a price premium for a project:

The exercise price S is the fixed price of the service.

The current price L is the current estimate to complete the project.

The interest rate r is the risk-free rate (e.g., as approximated using the U.S. Treasury bill rate).

Time to maturity t is the time remaining until payment for the project is due.

Variability σ is the standard deviation per period (e.g., at a continuous compounding rate).

N is the cumulative normal distribution function.

e is the mathematical constant e.

The fact that the variability parameter is a rate (i.e., per unit time) may seem natural for a traded financial instrument (e.g., a financial option), but somewhat awkward for a project. However, the variability parameter is multiplied by time—either $\sigma\sqrt{t}$ or $\sigma^2 t$, so the product (i.e., the variability for the entire remainder of the project) may be computed instead of attempting to derive some type of rate.

In certain embodiments, the price premium for the project may be determined using the binomial method, another option-pricing mathematical model for financial instruments. In certain embodiments, use of the binomial method includes building, based on project information for a project, a tree of actual project price scenarios. These actual prices may be separated by time, such that the root of the tree is the price of the project (e.g., the services contract) at time zero (today), the next level of the tree is at the time one (one-month in the future), the next level of the tree is at time two (two-months in the future), and so on. Each level of the tree may give two options for the price of project for each node at the next highest level of the tree, one outcome for the price increasing and one outcome for the price decreasing.

Figure 4:
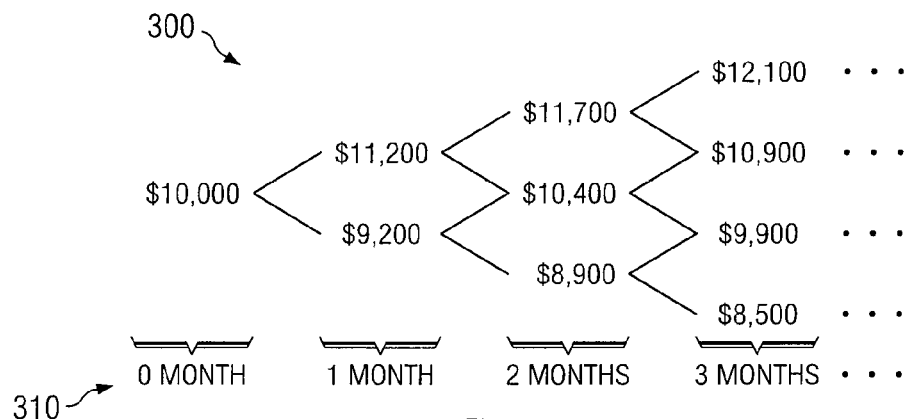
FIG. 4 illustrates an example tree of actual project price scenarios for a project.

FIG. 4 illustrates an example tree 300 of actual project price scenarios for a project. In the illustrated example, the price of the project today (without considering any price premium) is $10,000. Each level of the tree is associated with a time period for the project. In the illustrated example, as can be seen on timeline 310, the project begins at month zero (the date at which the project is entered into) and each subsequent level in the tree represents a one-month advance in the project. Typically, this timeline (and the associated pricing scenarios of the tree) would extend over the expected life of the project. For each price in the tree, the next level may include two "child" prices. One child price may reflect a potential increase in the price, and the other price may reflect a potential decrease in the price. These prices may be determined in any suitable manner, according to particular needs.

In certain embodiments, a volatility estimate may be used for calculating the actual prices in the tree.

The tree of actual price scenarios may be used to determine a price premium for the project using the binomial method. According to the binomial method, for each increase or decrease in price reflected in the tree (e.g., moving from one node in the tree to the next level in the tree), two probabilities are determined. The first probability is the probability that the price will increase, and the second probability is the probability that the price will decrease. The total of the probabilities for a particular increase/decrease possibility in the tree is one-hundred percent. These probabilities may be determined according to the binomial method. The binomial method uses a predetermined rate for calculating the probabilities and the option prices. In certain embodiments, this predetermined rate is the risk-free rate; however, the present invention contemplates using any suitable rate according to particular needs. Based on the determined probabilities, the price premium may be determined.

Returning to FIG. 1, with certain of the option-pricing mathematical models contemplated by the present invention, including the example provided above, the one or more parameters for the mathematical models comprise one or more of a project duration parameter, a time-value-of-money parameter, a variability parameter, and an expected project price parameter. Each of these example parameters are described below.

The project duration parameter may represent the length of time expected to complete the project. The duration of a project is often a significant driver of the cost (and thus ultimately, the appropriate price premium) for the project. For example, in general the longer a project extends (i.e., the longer the duration of the project), the longer the project is exposed to the types of risks that tend to cause costs to vary. Taking a software development project as an example, much of what typically drives the cost or price of the project up or down tends to be that the world changes around the project between the initial set of requirements and when the project (i.e., the developed software) is ultimately delivered. These changes may include changes in the costs of materials, changes in the costs of labor, changes in the customer's requirements (e.g., change orders from the customer), or other suitable changes. On the other hand, in general the shorter the duration of a project, the less risky the project is because there is less time for circumstances surrounding the project to change.

The time-value-of-money parameter may represent the compounding of interest as applicable to a customer's payment schedule. The time value of money for a particular project may be explicit or implicit. For example, the time value of money for a particular project may be a number that is explicitly provided to the client. As another example, the time value of money for a particular project may be an internal number used to reflect costs, which may only be reflected through the payment schedule to the client.

The variability parameter may represent the likelihood that the actual price for the project will vary from the expected price for the project. This may reflect the likelihood that the costs of the project (or other issues that may affect the price of the project) will vary over the duration of the project. In general, certain types of projects are inherently more variable (e.g., which may mean that those projects are riskier) than others.

To facilitate the determination of a value for the variability parameter in certain embodiments of the present invention, system 10 includes one or more of an enterprise-specific historical project information database 14a and an industry historical project information database 14b. Enterprise-specific historical project information database 14a stores enterprise-specific historical project data 28. Enterprise-specific historical project data 28 may include information regarding past projects of the enterprise associated with system 10 (e.g., the contractor). For example, enterprise-specific historical project data 28 may include various parameters of the past projects, characteristics of the past projects, outcomes of the past projects, financial data regarding the past projects, or any other suitable information regarding the past projects. As new projects are completed by the enterprise, enterprise-specific historical project information database 14a may be updated with enterprise-specific historical project data 28 for the new projects.

Industry historical project information database 14b stores industry historical project data 30. Industry historical project data 30 may include industry information regarding projects throughout the industry, which may include information from multiple contractors. For example, industry historical project data 30 may include various parameters of the past projects, characteristics of the past projects, outcomes of the past projects, financial data regarding the past projects, or any other suitable information regarding the past projects. Industry historical project information database 14b may be updated in any suitable manner and at any suitable intervals.

Although a single enterprise-specific historical project information database 14a and a single industry historical project information database 14b are illustrated and primarily described, system 10 may include multiple databases 14a and 14b if appropriate. As just one example, system 10 may include different industry historical project information databases for each type of industry (or certain types of industries) for which a project may be priced. Moreover, although enterprise-specific historical project information database 14a and industry historical project information database 14b are illustrated as being separate, the present invention contemplates databases 14a and 14b being a single database. For example, a user of system 10 may download industry historical project information 30 to a database 14 associated with the enterprise, which may be the same database 14 in which the enterprise stores enterprises-specific historical project information 28. Furthermore, the present invention contemplates system 10 including only one of databases 14a or 14b. Throughout the remainder of this description, references to historical project data, unless otherwise specified, refers to information that may include enterprise-specific historical project data 28, industry historical project data 30, or both.

Enterprise-specific historical project information database 14a may store statistical project data 32. Although statistical project data 32 is illustrated as being stored in enterprise-specific historical project information database 14a, the present invention contemplates statistical project data 32 being stored in any suitable location such that it is accessible to pricing application 26. Statistical project data 32 may be determined by pricing application 26, by another suitable component of system 10, manually, or in any other suitable manner according to particular needs.

Statistical project data 32 may include a statistical analysis of one or more of enterprise-specific historical project data 28 and industry historical project data 30. In certain embodiments, the historical project data may be analyzed and partitioned into types of projects. For example, the types of projects may include software development projects, construction projects, manufacturing projects, or any other suitable types of projects. As another example, the types of projects could include different types of projects with respect to software applications, such as development services, enhancement services, and maintenance services. As another example, for more granularity, the types of projects may be categorized by industry. In certain embodiments, a beta distribution may be generated for each partition. Pricing application 26 may determine the variability value using statistical project data 32, as will be described in more detail below.

Returning to the example parameters of the option-pricing mathematical model, the expected project price parameter reflects the expected project price for the new project and may be determined in any suitable manner. In certain embodiments, a project team for the project is responsible for determining the expected project price for the project. User system 12 may include one or more project price-estimating tools 32, which may be used for generating the expected project price for the new project. For example, project pricing tool 32 may include the SOFTWARE LIFECYCLE MANAGEMENT (SLIM) tool manufactured by QSM, Inc., the Constructive Cost Model (COCOMO) II, or any other suitable tool. In certain embodiments, the value determined for the expected project price variable is an average of multiple expected project prices, each determined from a corresponding project estimating tool 32.

In embodiments in which project pricing tool 32 comprises the SLIM tool, one or more of the following parameters may be used: development environment (e.g., on-line vs. batch, expressed as a proportion); programming languages; proportion of language use (e.g., high order, assembly, 4GL, DBMS, report writer, or screen writer); software type (e.g., business, military, avionics, real-time, etc.); new design vs. reused (e.g., expressed as a proportion); real-time code (e.g., expressed as a proportion); interface complexity; use of structured programming; use of top-down design; use of walk-throughs; use of program librarian; team overall experience level; team system size experience level; team language experience level; team computer model experience level; management headcount; staff buildup rate; and any other suitable parameters.

In embodiments in which project pricing tool 32 comprises the COCOMO II tool, one or more of the following parameters may be used: DATA (i.e., database size); CPLX (i.e., product complexity); TIME (i.e., execution time constraint); STOR (i.e., main storage constraint); RUSE (i.e., required reusability); DOCU (i.e., documentation match to life-cycle needs); PVOL (i.e., platform volatility); SCED (i.e., scheduling factor); RELY (i.e., required reliability); TOOL (i.e., use of software tools); APEX (i.e., application experience); ACAP (i.e., analyst capability); PCAP (i.e., programmer capability); PLEX (i.e., platform experience); LTEX (i.e., language and tools experience); PCON (i.e., personnel continuity); SITE (i.e., multi-site development); PREC (i.e., precedence); PMAT (i.e., process maturity); TEAM (i.e., team cohesion); FLEX (i.e., development flexibility); RESL (i.e., architecture and risk resolution); and any other suitable parameters.

Although a project duration parameter, a time-value-of-money parameter, a variability parameter, and an expected project price parameter have been primarily described, the present invention contemplates using any suitable parameters according to an appropriate option-pricing mathematical model for a financial instrument. The selection of the appropriate parameters depends, at least in part, on the selected option-pricing mathematical model.

In operation of an example embodiment of system 10, to set up system 10 for determining a price premium for a project, historical project data for a plurality of projects may be gathered. This historical project data may include enterprise-specific historical project data 28, industry historical project data 30, or both. Portions or all of historical project data 28 and 30 may be gathered and updated over time, as more projects are completed for example. The gathered historical project information may be stored in a suitable storage medium such as one or more project databases 14.

The historical project data may be analyzed to generate statistical project data 32. For example, one or more of enterprise-specific historical project data 28 and industry historical project data 30 may be analyzed to generate statistical project data 32. Statistical project data 32 may include variability values for certain types of projects. In certain embodiments, this analysis may include one or more of partitioning the past projects into types of projects, determining variability values for each type of project, determining the characteristics of each type of project, and determining the correlation between the certain types of project characteristics and certain variability values. This analysis may ultimately be used to determine which variability value to use for generating a price premium for a new project. In certain embodiments, statistical project data 32 comprises one or more beta distributions for each type of project. This analysis may be performed with any appropriate frequency, on a scheduled or other basis. For example, this analysis may be performed annually, quarterly, or any time historical information (e.g., for a newly-completed project) is added to one or more project databases 14.

A project-estimating worksheet 36 may be generated. Project-estimating worksheet 36 may be a physical collection of one or more documents that may be completed manually. Additionally or alternatively, project-estimating worksheet 36 may be an electronic document such as a spreadsheet or word-processor-generated document that may be completed by a user of user system 12 (or by a user of another computer system). Project-estimating worksheet 36 may include a list of questions or other entries for inputting information regarding one or more parameters of a new project that may be used in generating a price premium (and possibly a total price) for the new project. For example, project-estimating worksheet 36 may request information regarding one or more of the following: the project type; the duration of the project; the industry with which the project is associated; the variables from the SLIM tool or the COCOMO II; and any other suitable information. In certain embodiments, a different project estimating worksheet 36 is generated for different types of projects. For example, a project estimating worksheet 36 for a construction project may be different (at least in part) from a project estimating worksheet for a software development project 36.

In operation of an example embodiment of system 10, to determine a price premium for a project, a RFQ for a project may be received. For example, the RFQ may be received from a customer of the contractor. The RFQ may include one or more project requirements. In response to the RFQ, project information for the project may be determined, the project information comprising data for one or more parameters of the project. The project information may be determined, at least in part, from the project requirements specified in the RFQ. In certain embodiments, values for the one or more parameters of the project may be input into application 26. For example, these values may be typed into a spreadsheet. In certain embodiments, project estimating worksheet 36 may be completed for the project, project estimating worksheet 36 comprising information for the one or more parameters of the project. The project information included in project estimating worksheet may be input into pricing application 26, such as by automatically or manually incorporating at least a portion of the one or more parameters of the project information in a spreadsheet of pricing application 26. Pricing application 26 may access the one or more parameters of the project information.

Values for the one or more parameters of the option-pricing mathematical model to be used for generating the price premium for the project may be determined from the project information. In certain embodiments, the one or more parameters of the option-pricing mathematical model comprise one or more of a project duration parameter, a time-value-of-money parameter, a variability parameter, and an expected project price parameter. Although these parameters for the option-pricing mathematical model are primarily described, the present invention contemplates any other suitable parameters, according to particular needs. The values for each of these parameters may be determined in any suitable manner; however, example techniques for determining these parameters from the project information are described below. In certain embodiments, the values for each of these parameters are determined from one or more of the project information, enterprise-specific historical project data 28, industry historical project data 30 and statistical project data 32.

The value for the project duration parameter may be a value that is input as one of the one or more parameters of the project information. The project duration value may be determined based on the experience of the project team or using any other suitable factors, according to particular needs. The value for the time value of money parameter may be a value that is input as one of the one or more parameters of the project information. In certain embodiments, the time value of money value may reflect compounding of interest as applicable to the customer's payment schedule.

The value for the variability parameter may be determined according to one or more of the received project information for the project for which the bid is being generated, historical project data (e.g., enterprise-specific historical project data 28 and/or industry historical project data 30), and statistical project data 32. In certain embodiments, a statistical methodology may be used to compare one or more of the parameters of the project information for the new project to statistical profiles generated from historical project data 26 to determine the variability parameter value that should be used for the project. For example, beta distribution techniques may be used to determine the appropriate variability parameter value to use for the project. Statistical project data 32 may include a beta distribution for each of the partitions determined from the historical project information.

The variability parameter value for the project may be determined by comparing one or more of the project parameters of the project to an analysis of the historical project data. In certain embodiments, a statistical analysis of the project information for the project is compared to a statistical analysis of the historical project data (e.g., statistical project data 32) to determine a variability parameter value for the project. For example, pricing application 26 may determine a beta distribution for the project by analyzing the project information for the project, compare the beta distribution for the project to beta distributions of statistical project data 32 (each corresponding to a partition and an associated variability parameter value), determine which beta distribution of statistical project data 32 most closely matches the beta distribution for the project, and assign to the project the variability parameter value of the beta distribution that most closely matches the beta distribution of the project.

The value for the expected project price parameter for the project may be determined in any suitable manner. A project team for the project is responsible for determining the expected project price parameter value for the project. In certain embodiments, project-estimating tool 34 may be used for generating the expected project price parameter value. For example, project-estimating tool 34 may include the SOFTWARE LIFECYCLE MANAGEMENT (SLIM) tool manufactured by QSM, Inc., the COCOMO II, or any other suitable project-estimating tool. Appropriate parameters from the project information for the project may be input into project-estimating tool 34, and project-estimating tool 34 may generate an expected project price parameter value for the project based on these appropriate parameters. Although use of a single project-estimating tool 34 for generating the expected project price parameter value is primarily described, the present invention contemplates using multiple project-estimating tools 34 to generate the expected project price parameter value for the project. As just one example, multiple expected project prices may be generated, each by a corresponding project-estimating tool 34, and an average of the multiple expected project prices may be determined and used as the expected project price parameter value input into the option-pricing mathematical model.

The determined values for the parameters of the option-pricing mathematical model may be input into the option-pricing mathematical model. For example, pricing application 26 may access the determined values for the project parameters and input those determined parameter values into the option-pricing mathematical model. The option-pricing mathematical model may be evaluated based on the values for the parameters of the option-pricing mathematical model. For example, pricing application 26 may evaluate the option-pricing mathematical model based on the accessed values for the parameters of the option-pricing mathematical model. A price premium for the project is generated according to the values for the project parameters, using the option pricing mathematical model. For example, a price premium for the project may be generated, according to the project duration parameter, the time value of money parameter, the variability parameter, and the expected project price parameter, using the option-pricing mathematical model. In certain embodiments, the option-pricing mathematical model used by pricing application 26 includes the following formulas:

$$C = SN(d) - Le^{-rt}N(d - \sigma\sqrt{t});$$

and $$d = \frac{\ln\frac{S}{L} + \left(r + \frac{\sigma^2}{2}\right)t}{\sigma\sqrt{t}}.$$

Thus, the price premium may be computed using the values for the parameters of the option-pricing mathematical model. Although this particular formula for the option-pricing mathematical model is primarily described, the present invention contemplates using any suitable option-pricing mathematical model for a financial instrument, according to particular needs. For example, a number of variations of the Black-Scholes model exist, any one of which may be appropriate under certain circumstances. As another example, the financial instrument option-pricing mathematical model may include the Black model, Merton model, Black model (e.g., the Black 76 model), or any other suitable financial instrument option-pricing mathematical model. In certain embodiments, a total project price for the project may be generated. The total project price may be generated by summing the expected price of the project with the generated price premium.

The generated price premium may be reviewed by one or more appropriate parties to determine whether the price premium is appropriate. Additionally or alternatively, the total project price for the project may be reviewed to determine whether the total project price, including the price premium, is appropriate. The one or more appropriate parties may include any suitable individuals or collection of individuals as deemed appropriate. For example, the one or more appropriate parties may include a sales team within the contractor. The generated price premium (and generated total price, if applicable) may be in any suitable currency, according to particular needs.

If it is determined that the generated price premium is appropriate, then the price premium may be issued as the appropriate price premium for the project. In certain embodiments, this may include the total price of the project, which may be issued as a bid in response to the RFQ. If it is determined that the price premium is inappropriate, then one or more of the project parameters may be revised. The values for the project variables may be regenerated and the price premium may be regenerated.

Although an example implementation of system 10 is illustrated and primarily described, the present invention contemplates any suitable implementation of system 10. For example, portions or all of system 10 may be distributed. As just one example, a server may store and execute portions or all of pricing application 26, and a user of user system 12 may interact with the application 26 on the server (e.g., by completing and submitting a web form). In certain embodiments, pricing application 26 may be packaged as part of a pricing suite that can be provided as a commercial off-the-shelf product. Additionally or alternatively, pricing application 26 or at least portions of its functionality, may be provided as a web-accessible service.

Particular embodiments of the present invention may provide one or more technical advantages. In certain embodiments, a price premium for the price of a project is determined in part to account for the risk in the variability of the project. As such, the price premium may be thought of as risk insurance for the variability of the project. In certain embodiments, relative to conventional techniques, the present invention may provide a more accurate determination of the appropriate price premium to include in the price for a project. Previous techniques for pricing risks in services projects such as software projects use "rules of thumb" or "fudge factors," which may be based on a sales team's intuition and experience without any real rigor. On the other hand, certain embodiments of the present invention provide a technique for quantifying a variance value associated with a project and using that variance value in generating a price premium for the project. In certain embodiments, using an option-pricing mathematical model for financial instruments provides a suitable way to quantify the risk associated with a project, resulting in an price premium for the project.

In certain embodiments, the present invention may be used with either fixed price or time-and-materials pricing. In certain embodiments, the present invention prices projects in a manner that is substantially equitable for both the customer and the contractor, such that the risk is shared more evenly than with conventional techniques for pricing projects. In certain embodiments, the present invention may be used by a contractor as a strategic component in bidding for contracts. The present invention may facilitate a more collaborative dialogue around questions that may be raised by the pricing of projects that are not possible with conventional techniques.

Figure 5:
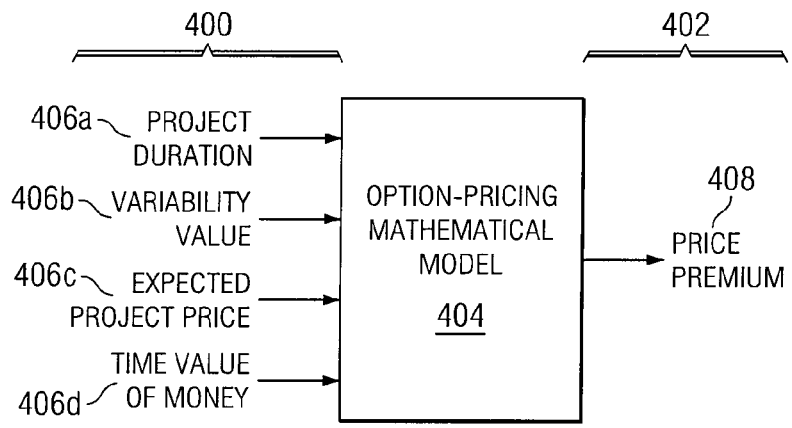
FIG. 5 illustrates an example block diagram of example inputs and an example output of an option-pricing mathematical model according to certain embodiments of the present invention.

FIG. 5 illustrates an example block diagram of example inputs 400 and an example output 402 of a option-pricing mathematical model 404 according to certain embodiments of the present invention. Although particular inputs 400 and an example output 402 are illustrated and primarily described, the present invention contemplates any suitable inputs and outputs, according to particular needs. Additionally, although particular option-pricing mathematical models 404 are primarily described, the present invention contemplates any suitable option-pricing mathematical model 404, according to particular needs.

Inputs 400 may include one or more project parameters 406. In certain embodiments, project parameters 406 include a project duration parameter 406a, a variability parameter 406b, an expected project price parameter 406c, and a time value of money parameter 406d. Each of these example project parameters 406 are described above with reference to FIG. 1. Although particular numbers and types of project parameters 406 are illustrated and described, the present invention contemplates any suitable number and types of project parameters 406. As described above with reference to FIG. 1, values for inputs 400 may be determined from project information that comprises one or more project parameters. These project parameters may be determined in response to a RFQ for a project.

Option-pricing mathematical model 404 may include a variant of the Black-Scholes model, Merton model, Black model (e.g., the Black 76 model), or any other suitable option-pricing mathematical mode for financial instruments. As described above, in certain embodiments, option-pricing mathematical model 404 comprises the following formulas:

$$C = SN(d) - Le^{-rt}N(d - \sigma\sqrt{t});$$

and $$d = \frac{\ln\frac{S}{L} + \left(r + \frac{\sigma^2}{2}\right)t}{\sigma\sqrt{t}}.$$

Output 402 of option-pricing mathematical model 404 may include a price premium 408 for the project. As described above, the generated price premium 408 may be summed with expected project price 406c to determine a total project price for the project.

Figure 6:
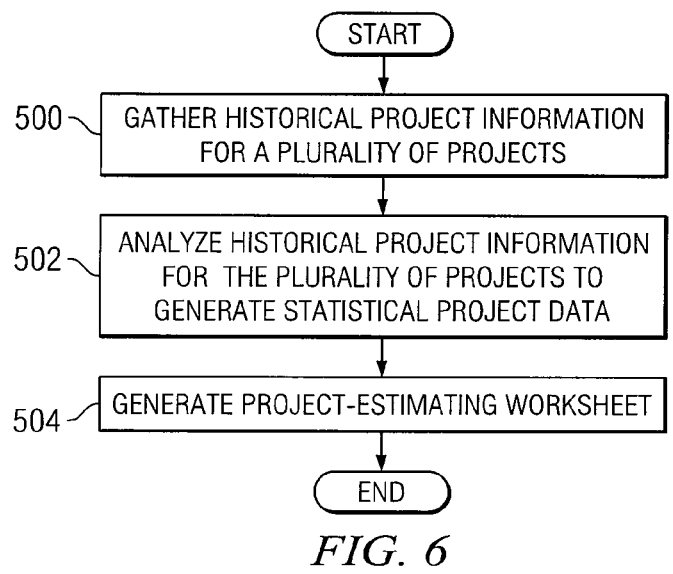
FIG. 6 illustrates an example method for setting up the system for determining a price premium for a project according to certain embodiments of the present invention.

FIG. 6 illustrates an example method for setting up system 10 for determining a price premium for a project according to certain embodiments of the present invention. Portions of the method may be performed manually, or the entire method may be performed automatically (e.g., by pricing application 26 or other components of system 10).

At step 500, historical project data for a plurality of projects may be gathered. This historical project data may include enterprise-specific historical project data 28, industry historical project data 30, or both. Portions or all of historical project data 28 and 30 may be gathered and updated over time, as more projects are completed for example. The gathered historical project information may be stored in a suitable storage medium such as one or more project databases 14.

At step 502, the historical project data may be analyzed to generate statistical project data 32. For example, one or more of enterprise-specific historical project data 28 and industry historical project data 30 may be analyzed to generate statistical project data 32. Statistical project data 32 may include variability values for certain types of projects. In certain embodiments, this analysis may include one or more of partitioning the past projects into types of projects, determining variability values for each type of project, determining the characteristics of each type of project, and determining the correlation between the certain types of project characteristics and certain variability values. This analysis may ultimately be used to determine which variability value to use for generating a price premium for a new project. In certain embodiments, statistical project data 32 comprises one or more beta distributions for each type of project. This analysis may be performed with any appropriate frequency, on a scheduled or other basis. For example, this analysis may be performed annually, quarterly, or any time historical information (e.g., for a newly-completed project) is added to one or more project databases 14.

At step 504, a project-estimating worksheet 36 may be generated. Project-estimating worksheet 36 may be a physical collection of one or more documents that may be completed manually. Additionally or alternatively, project-estimating worksheet 36 may be an electronic document such as a spreadsheet or word-processor-generated document that may be completed by a user of user system 12 (or by a user of another computer system). Project-estimating worksheet 36 may include a list of questions or other entries for inputting information regarding one or more parameters of a new project that may be used in generating a price premium (and possibly a total price) for the new project. For example, project-estimating worksheet 36 may request information regarding one or more of the following: the project type; the duration of the project; the industry with which the project is associated; the variables from the SLIM tool or the COCOMO II; and any other suitable information. In certain embodiments, a different project estimating worksheet 36 is generated for different types of projects. For example, a project estimating worksheet 36 for a construction project may be different (at least in part) from a project estimating worksheet for a software development project 36.

Figure 7:
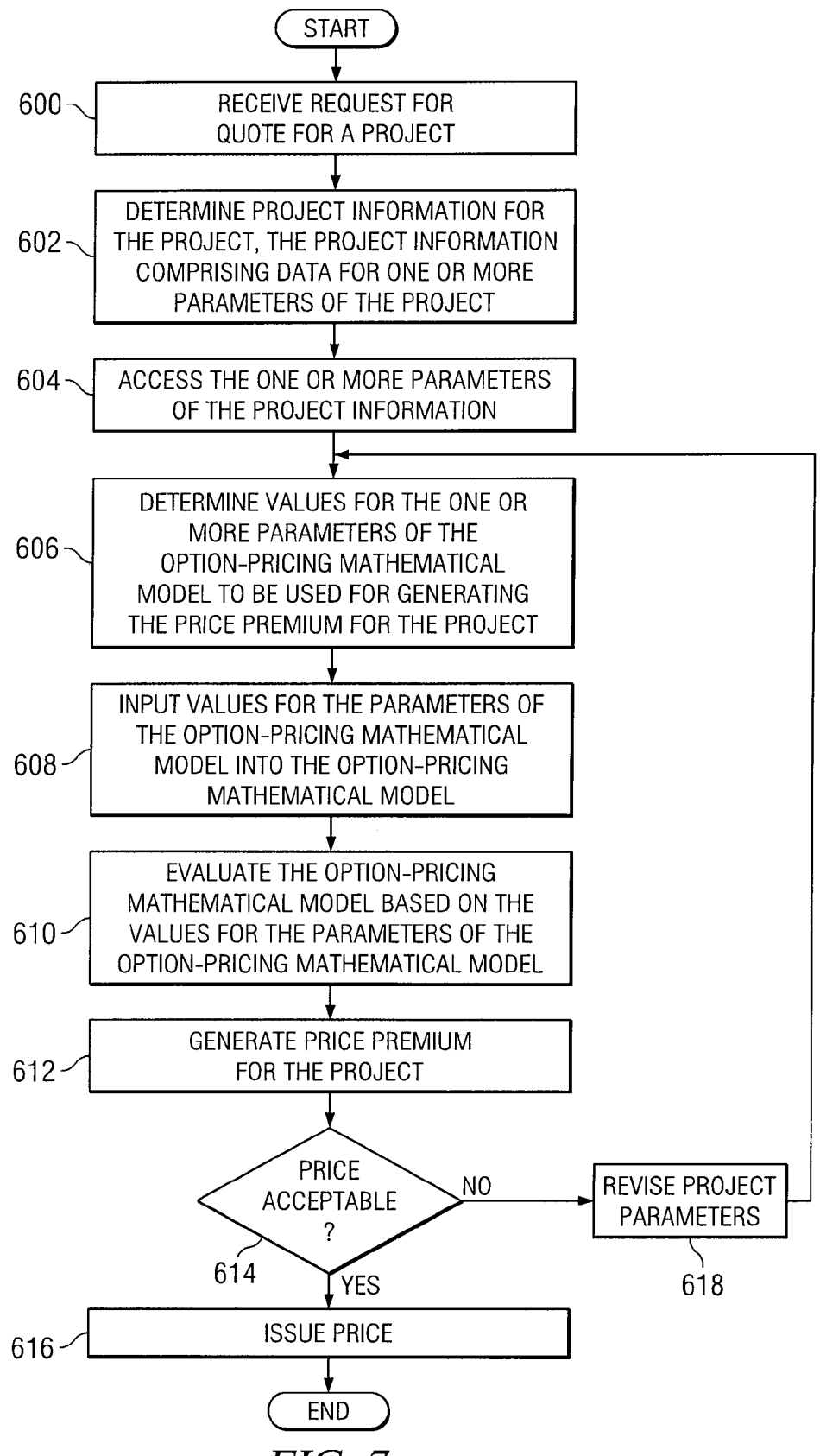
FIG. 7 illustrates an example method for determining a price premium for a project according to certain embodiments of the present invention.

FIG. 7 illustrates an example method for determining a price premium for a project according to certain embodiments of the present invention. Portions of the method may be performed manually, or the entire method may be performed automatically (e.g., by pricing application 26 or other components of system 10).

At step 600, an RFQ for a project may be received. For example, the RFQ may be received from a customer of the contractor. The RFQ may include one or more project requirements. At step 602, in response to the RFQ, project information for the project may be determined, the project information comprising data for one or more parameters of the project. The project information may be determined, at least in part, from the project requirements specified in the RFQ. In certain embodiments, values for the one or more parameters of the project may be input into application 26. For example, these values may be typed into a spreadsheet. In certain embodiments, project estimating worksheet 36 may be completed for the project, project estimating worksheet 36 comprising information for the one or more parameters of the project. The project information included in project estimating worksheet may be input into pricing application 26, such as by automatically or manually incorporating at least a portion of the one or more parameters of the project information in a spreadsheet of pricing application 26. At step 604, pricing application 26 may access the one or more parameters of the project information.

At step 606, values for the one or more parameters of the option-pricing mathematical model to be used for generating the price premium for the project may be determined from the project information. In certain embodiments, the one or more parameters of the option-pricing mathematical model comprise one or more of a project duration parameter, a time value of money parameter, a variability parameter, and an expected project price parameter. Although these parameters for the option-pricing mathematical model are primarily described, the present invention contemplates any other suitable parameters, according to particular needs. The values for each of these parameters may be determined in any suitable manner; however, example techniques for determining these parameters from the project information are described below. In certain embodiments, the values for each of these parameters are determined from one or more of the project information, enterprise-specific historical project data 28, industry historical project data 30 and statistical project data 32.

The value for the project duration parameter may be a value that is input as one of the one or more parameters of the project information. The project duration value may be determined based on the experience of the project team or using any other suitable factors, according to particular needs. The value for the time value of money parameter may be a value that is input as one of the one or more parameters of the project information. In certain embodiments, the time value of money value may reflect compounding of interest as applicable to the customer's payment schedule.

The value for the variability parameter may be determined according to one or more of the received project information for the project for which the bid is being generated, historical project data (e.g., enterprise-specific historical project data 28 and/or industry historical project data 30), and statistical project data 32. In certain embodiments, a statistical methodology may be used to compare one or more of the parameters of the project information for the new project to statistical profiles generated from historical project data 26 to determine the variability parameter value that should be used for the project. For example, beta distribution techniques may be used to determine the appropriate variability parameter value to use for the project. Statistical project data 32 may include a beta distribution for each of the partitions determined from the historical project information. The variability parameter value for the project may be determined by comparing one or more of the project parameters of the project to an analysis of the historical project data. In certain embodiments, a statistical analysis of the project information for the project is compared to a statistical analysis of the historical project data (e.g., statistical project data 32) to determine a variability parameter value for the project. For example, pricing application 26 may determine a beta distribution for the project by analyzing the project information for the project, compare the beta distribution for the project to beta distributions of statistical project data 32 (each corresponding to a partition and an associated variability parameter value), determine which beta distribution of statistical project data 32 most closely matches the beta distribution for the project, and assign to the project the variability parameter value of the beta distribution that most closely matches the beta distribution of the project.

The value for the expected project price parameter for the project may be determined in any suitable manner. A project team for the project is responsible for determining the expected project price parameter value for the project. In certain embodiments, project-estimating tool 34 may be used for generating the expected project price parameter value. For example, project-estimating tool 34 may include the SOFTWARE LIFECYCLE MANAGEMENT (SLIM) tool manufactured by QSM, Inc., the COCOMO II, or any other suitable project-estimating tool. Appropriate parameters from the project information for the project may be input into project-estimating tool 34, and project-estimating tool 34 may generate an expected project price parameter value for the project based on these appropriate parameters. Although use of a single project-estimating tool 34 for generating the expected project price parameter value is primarily described, the present invention contemplates using multiple project-estimating tools 34 to generate the expected project price parameter value for the project. As just one example, multiple expected project prices may be generated, each by a corresponding project-estimating tool 34, and an average of the multiple expected project prices may be determined and used as the expected project price parameter value input into the option-pricing mathematical model.

At step 608, the determined values for the parameters of the option-pricing mathematical model may be input into the option-pricing mathematical model. For example, pricing application 26 may access the determined values for the project parameters and input those determined parameter values into the option-pricing mathematical model. At step 610, the option-pricing mathematical model may be evaluated based on the values for the parameters of the option-pricing mathematical model. For example, pricing application 26 may evaluate the option-pricing mathematical model based on the accessed values for the parameters of the option-pricing mathematical model. At step 612, a price premium for the project is generated according to the values for the project parameters, using the option pricing mathematical model. For example, a price premium for the project may be generated, according to the project duration parameter, the time value of money parameter, the variability parameter, and the expected project price parameter, using the option-pricing mathematical model. In certain embodiments, the option-pricing mathematical model used by pricing application 26 includes the following formulas:

$$C = SN(d) - Le^{-rt}N(d - \sigma\sqrt{t});$$

and $$d = \frac{\ln\frac{S}{L} + \left(r + \frac{\sigma^2}{2}\right)t}{\sigma\sqrt{t}}.$$

Thus, the price premium may be computed using the values for the parameters of the option-pricing mathematical model. Although this particular formula for the option-pricing mathematical model is primarily described, the present invention contemplates using any suitable option-pricing mathematical model for a financial instrument, according to particular needs. For example, a number of variations of the Black-Scholes model exist, any one of which may be appropriate under certain circumstances. As another example, the financial instrument option-pricing mathematical model may include the Black model, Merton model, Black model (e.g., the Black 76 model), or any other suitable financial instrument option-pricing mathematical model. In certain embodiments, a total project price for the project may be generated. The total project price may be generated by summing the expected price of the project with the generated price premium.

At step 614, the generated price premium may be reviewed by one or more appropriate parties to determine whether the price premium is appropriate. Additionally or alternatively, the total project price for the project may be reviewed to determine whether the total project price, including the price premium, is appropriate. The one or more appropriate parties may include any suitable individuals or collection of individuals as deemed appropriate. For example, the one or more appropriate parties may include a sales team within the contractor. The generated price premium (and generated total price, if applicable) may be in any suitable currency, according to particular needs.

If it is determined at step 614 that the generated price premium is appropriate, then at step 616 the price premium may be issued as the appropriate price premium for the project. In certain embodiments, this may include the total price of the project, which may be issued as a bid in response to the RFQ. If it is determined at step 614 that the price premium is inappropriate, then one or more of the project parameters may be revised at step 618. The values for the project variables may be regenerated and the price premium may be regenerated.

Although particular methods have been described with reference to FIGS. 6-7, the present invention contemplates any suitable methods in accordance with the present invention. Thus, certain of the steps described with reference to FIGS. 6-7 may take place substantially simultaneously and/or in different orders than as shown and described. Moreover, components of system 10 may use methods with additional steps, fewer steps, and/or different steps, so long as the methods remain appropriate.

Although the present invention has been described with several embodiments, diverse changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A computer-implemented method for determining a price premium for a project, comprising:
    accessing using a processing module of a computer system project information comprising values for one or more parameters of a project, the project information being stored in a memory module of the computer system;
    determining from the project information a project duration for the project;
    determining from the project information a time value of money for the project;
    determining from the project information a variability value for the project;
    determining from the project information an expected project price: and
    generating using the processing module of the computer system, according to the project duration, the time value of money, the variability value, and the expected project price, a price premium for the project using an option-pricing mathematical model for financial instruments,
    wherein the option-pricing mathematical model comprises the following formulas:

$$C = SN(d) - Le^{-rt}N(d - \sigma\sqrt{t}); \text{ and}$$

$$d = \frac{\ln\frac{S}{L} + \left(r + \frac{\sigma^2}{2}\right)t}{\sigma\sqrt{t}}$$

where variables C and d are defined in terms of a variable S that represents an exercise price, a variable L that represents a current price, a variable r that represents an interest rate, a variable t that represents a time to maturity, a variable σ that represents a variability in terms of a standard deviation per period, a variable N that represents a cumulative normal distribution function, and a variable e that represents a mathematical constant.

2. The computer-imlemented method of claim 1, wherein determining from the project information the variability value for the project comprises:
   accessing stored historical information regarding past projects; and
   comparing at least a portion of the values of the one or more parameters of the project information for the project to the historical information regarding the past projects to determine the variability value for the project.

3. The computer-implemented method of claim 1, wherein the option-pricing mathematical model comprises a variant of the Black-Scholes model.

4. The computer-implemented method of claim 1, wherein the expected price of the project is determined using SOFTWARE LIFECYCLE MANAGEMENT (SLIM).

5. The computer-implemented method of claim 1, wherein the project comprises one or more of the following:
   a software services project;
   a construction project; and
   a manufacturing project.

6. The method of claim 1, wherein the values for the one or more parameters of the project information for the project were determined in response to a request for quote.

7. The computer-implemented method of claim 1, further comprising generating a total price for the project, the price comprising a sum of the generated price premium for the project and the expected project price.

8. The computer-implemented method of claim 1, further comprising displaying a form for gathering values for the one or more parameters.

9. Software for determining a price premium for a project the software being embodied in a non-transitory computer-readable medium and when executed, the software being operable to:
   access project information comprising values for one or more parameters of a project;
   determine from the project information a project duration for the project,
   determine from the project information a time value of money for the project;
   determine from the project information a variability value for the project;
   determine from the project information an expected project price; and
   generate, according to the project duration, the time value of money, the variability value, and the expected project price, a price premium for the project using an option-pricing mathematical model for financial instruments,
   wherein the option-pricing mathematical model comprises the following formulas:

$$C = SN(d) - Le^{-rt}N(d - \sigma\sqrt{t}); \text{ and}$$

$$d = \frac{\ln\frac{S}{L} + \left(r + \frac{\sigma^2}{2}\right)t}{\sigma\sqrt{t}}$$

where variables C and d are defined in terms of a variable S that represents an exercise price, a variable L that represents a current price, a variable r that represents an interest rate, a variable t that represents a time to maturity, a variable σ that represents a variability in terms of a standard deviation per period, a variable N that represents a cumulative normal distribution function, and a variable e that represents a mathematical constant.

10. The software of claim 9, operable to determine from the project information the variability value for the project by:
    accessing stored historical information regarding past projects; and
    comparing at least a portion of the values of the one or more parameters of the project information for the project to the historical information regarding the past projects to determine the variability value for the project.

11. The software of claim 9 wherein the option-pricing mathematical model comprises a variant of the Black-Scholes model.

12. The software of claim 9, wherein the expected price of the project is determined using SOFTWARE LIFECYCLE MANAGEMENT (SLIM).

13. The software of claim 9, wherein the project comprises one or more of the following:
    a software services project;
    a construction project; and
    a manufacturing project.

14. The software of claim 9, wherein the values for the one or more parameters of the project information for the project were determined in response to a request for quote.

15. The software of claim 9, further operable to generate a total price for the project, the price comprising a sum of the generated price premium for the project and the expected project price.

16. The software of claim 9, further operable to display a form for gathering values for the one or more parameters.

17. A system for determining a price premium for a project, comprising:
    a memory module operable to store project information comprising values for one or more parameters of a project; and
    one or more processing units collectively operable to:
       determine from the project information a project duration for the project;
       determine from the project information a time value of money for the project;
       determine from the project information a variability value for the project:
       determine from the project information an expected project and
    generate, according to the project duration, the time value of money, the variability value, and the expected project price, a price premium for the project using an option-pricing mathematical model for financial instruments,
    wherein the option-pricing mathematical model comprises the following formulas:

$$C = SN(d) - Le^{-rt}N(d - \sigma\sqrt{t}); \text{ and}$$

$$d = \frac{\ln\frac{S}{L} + \left(r + \frac{\sigma^2}{2}\right)t}{\sigma\sqrt{t}}$$

where variables C and d are defined in terms of a variable S that represents an exercise price, a variable L that represents a current price, a variable r that represents an interest rate, a variable t that represents a time to maturity, a variable σ that represents a variability in terms of a standard deviation per period, a variable N that represents a cumulative normal distribution function, and a variable e that represents a mathematical constant.

18. The system of claim 17, wherein the one or more processing units are operable to determine from the project information the variability value for the project by:
  accessing stored historical information regarding past projects; and
  comparing at least a portion of the values of the one or more parameters of the project information for the project to the historical information regarding the past projects to determine the variability value for the project.

19. The system of claim 17, wherein the option-pricing mathematical model comprises a variant of the Black-Scholes model.

20. The system of claim 17, wherein the expected price of the project is determined using SOFTWARE LIFECYCLE MANAGEMENT (SLIM).

21. The system of claim 17, wherein the project comprises one or more of the following:
  a software services project;
  a construction project; and
  a manufacturing project.

22. The system of claim 17, wherein the values for the one or more parameters of the project information for the project were determined in response to a request for quote.

23. The system of claim 17, wherein the one or more processing units are further operable to generate a total price for the project, the price comprising a sum of the generated price premium for the project and the expected project price.

24. The system of claim 17, wherein the one or more processing units are further operable to display a form for gathering values for the one or more parameters.

* * * * *

UNITED STATES PATENT AND TRADEMARK OFFICE
CERTIFICATE OF CORRECTION

PATENT NO. : 8,332,331 B2
APPLICATION NO. : 11/688094
DATED : December 11, 2012
INVENTOR(S) : John A. Thywissen Page 1 of 1

It is certified that error appears in the above-identified patent and that said Letters Patent is hereby corrected as shown below:

In column 20, line 46, in Claim 1, delete "price:" and insert -- price; --, therefor.

In column 21, line 3, in Claim 2, delete "computer-imlemented" and insert -- computer-implemented --, therefor.

In column 21, line 34, in Claim 9, delete "project" and insert -- project, --, therefor.

In column 21, line 41, in Claim 9, delete "project," and insert -- project; --, therefor.

In column 22, lines 31-32, in Claim 17, delete "project,comprising:" and insert -- project, comprising: --, therefor.

In column 22, line 42, in Claim 17, delete "project:" and insert -- project; --, therefor.

In column 22, line 44, in Claim 17, after "project" insert -- price; --.

Signed and Sealed this
Second Day of April, 2013

Teresa Stanek Rea
*Acting Director of the United States Patent and Trademark Office*